(12) United States Patent
Estevez et al.

(10) Patent No.: US 8,184,154 B2
(45) Date of Patent: May 22, 2012

(54) VIDEO SURVEILLANCE CORRELATING DETECTED MOVING OBJECTS AND RF SIGNALS

(75) Inventors: Leonardo W. Estevez, Rowlett, TX (US); Keith G. Gutierrez, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 1427 days.

(21) Appl. No.: 11/679,278

(22) Filed: Feb. 27, 2007

(65) Prior Publication Data

US 2007/0257985 A1 Nov. 8, 2007

Related U.S. Application Data

(60) Provisional application No. 60/777,428, filed on Feb. 27, 2006.

(51) Int. Cl.
*H04N 9/47* (2006.01)
*H04N 7/18* (2006.01)

(52) U.S. Cl. ........ 348/142; 348/143; 348/149; 348/152; 348/154; 342/28; 396/153

(58) Field of Classification Search .......... 348/142–149, 348/152–155; 342/28; 386/224–228; 396/153
See application file for complete search history.

(56) References Cited

U.S. PATENT DOCUMENTS

| | | | |
|---|---|---|---|
| 6,377,296 B1 * | 4/2002 | Zlatsin et al. ................. 348/143 |
| 6,380,882 B1 * | 4/2002 | Hegnauer ........................ 342/28 |
| 6,396,534 B1 * | 5/2002 | Mahler et al. ................. 348/155 |
| 6,542,621 B1 | 4/2003 | Brill et al. |
| 6,570,608 B1 | 5/2003 | Tserng |
| 6,628,835 B1 | 9/2003 | Brill et al. |
| 6,754,368 B1 * | 6/2004 | Cohen ........................... 382/103 |
| 6,816,184 B1 | 11/2004 | Brill et al. |
| 6,937,651 B1 | 8/2005 | Brill et al. |
| 6,980,151 B1 * | 12/2005 | Mohan ............................ 342/28 |
| 7,019,644 B2 * | 3/2006 | Barrie ...................... 340/539.13 |
| 7,023,469 B1 | 4/2006 | Olson |
| 7,061,366 B2 * | 6/2006 | Bell et al. ........................ 713/155 |
| 7,847,820 B2 * | 12/2010 | Vallone et al. ................. 348/143 |
| 2006/0064384 A1 * | 3/2006 | Mehrotra et al. .............. 348/154 |
| 2006/0279630 A1 * | 12/2006 | Aggarwal et al. ............. 348/143 |
| 2007/0097211 A1 * | 5/2007 | Washington .................. 348/135 |
| 2007/0120979 A1 * | 5/2007 | Zhang et al. .................. 348/154 |
| 2007/0182818 A1 * | 8/2007 | Buehler ........................ 348/143 |

* cited by examiner

*Primary Examiner* — Ramy M Osman
(74) *Attorney, Agent, or Firm* — Robert D. Marshall, Jr.; Wade James Brady, III; Frederick J. Telecky, Jr.

(57) ABSTRACT

A surveillance method periodically detects an image of the area, identifies and tracks each moving object in a succession of the detected images, detects radio frequency emissions from the area and correlates an identified object with a detected radio frequency emission. The method detects events in the tracking of the moving object. The method stores corresponding data optionally including image data in non-volatile memory upon detection of a combination of an event and a corresponding radio frequency emission. The method triggers an alarm such as an audible alarm, a visual alarm, an email, a short text message or a telephone call detection of a combination of an event and a corresponding radio frequency emission.

7 Claims, 4 Drawing Sheets

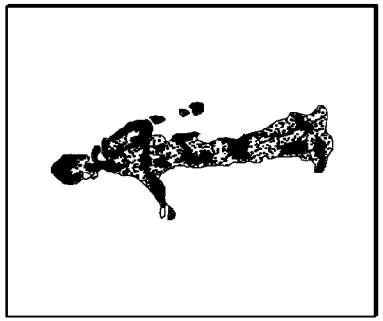
*FIG. 2A*
*(PRIOR ART)*
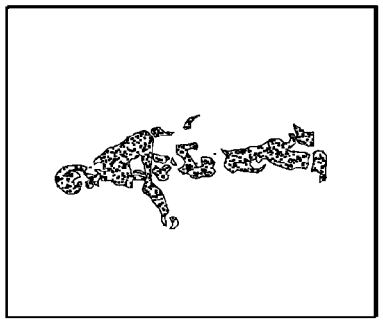
*FIG. 2B*
*(PRIOR ART)*
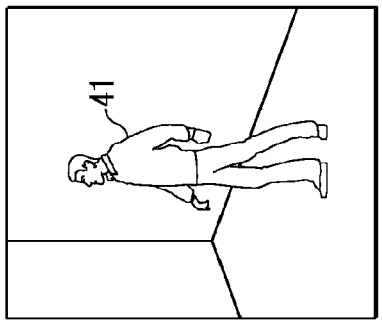
*FIG. 2C*
*(PRIOR ART)*
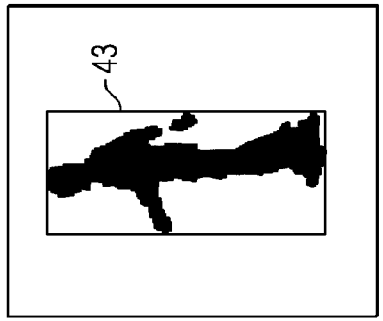
*FIG. 2D*
*(PRIOR ART)*
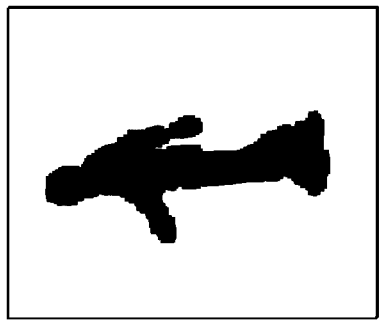
*FIG. 2E*
*(PRIOR ART)*
*FIG. 2F*
*(PRIOR ART)*
*FIG. 2G*
*(PRIOR ART)*
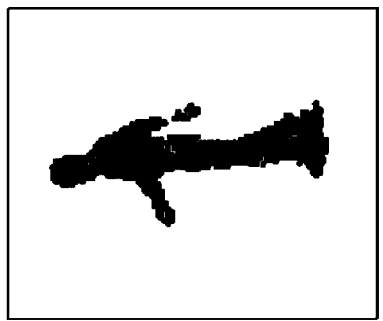
*FIG. 2H*
*(PRIOR ART)*

VIDEO SURVEILLANCE CORRELATING DETECTED MOVING OBJECTS AND RF SIGNALS

CLAIM OF PRIORITY

This application claims priority under 35 U.S.C. 119(e)(1) to U.S. Provisional Application No. 60/777,428 filed Feb. 27, 2006.

TECHNICAL FIELD OF THE INVENTION

The technical field of this invention is automated video surveillance systems.

BACKGROUND OF THE INVENTION

As video cameras have become increasingly cheaper to produce and purchase, their functionality is beginning to evolve beyond their original intent to merely capture sequences of images. Smart video cameras of the future will be able to provide intelligent data about what objects moved and what events occurred within their field of view. The new functionality of smart cameras provides many new applications.

One increasingly valuable application for smart cameras is surveillance. Typical prior art surveillance cameras record hundreds of hours of moving images onto video tape which must be monitored by people in order to tell if something suspicious occurred. Most of the video data is useless because nothing interesting is occurring. However, with smart cameras, people can be alerted to specific events which the smart cameras detect. As smart cameras are developed, software algorithms will need to be developed to implement the smart monitoring functions.

Video motion detection (VMD) detects motion within the view of the security camera to trigger data storage or alarms. VDM is not considered a real time event detection technology because it does not enable the user to specify exactly what event is of interest for real time notification. VDM may be considered a smart compression technology.

SUMMARY OF THE INVENTION

The greatest differentiation in security surveillance systems will come in the ability to alert people of interesting events in real time. There are two primary pieces of information of special interest to almost all users: Who is the actor in the scene?; and Where/when/with whom else do I see this actor? This boils down to identification and association.

Thus there is a need in the art to index a video surveillance database with specifics of who is in or around the scene over time. This invention detects wireless packets in the area of interest and indexes the video which is stored with the MAC addresses so that queries to the video database can be made with specific MAC addresses corresponding to individuals who are carrying WIFI enabled mobile devices. These scenes may be also be accessed via various other unique identifying wireless technology such as RFID, Bluetooth, etc.

Detection of events in the controlled space including objects identified by RF signals can trigger storage of data or an alarm. The video database may be searched to determine suspicious activity patterns or recurring activity patterns. This invention provides these advanced types of queries to be integrated with low cost video surveillance systems.

BRIEF DESCRIPTION OF THE DRAWINGS

These and other aspects of this invention are illustrated in the drawings, in which:

FIGS. 2A, 2B, 2C, 2D, 2E, 2F, 2G and 2H are diagrammatic views of two-dimensional images that represent successive steps carried out by the system of FIG. 1 when processing images obtained from a video camera (prior art);

DETAILED DESCRIPTION OF PREFERRED EMBODIMENTS

Figure 1:
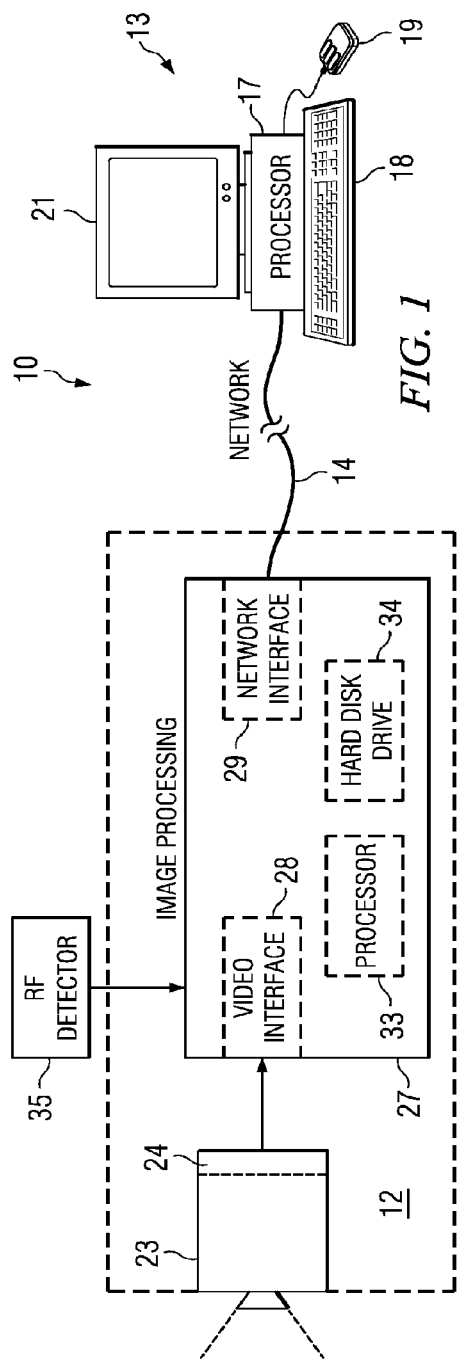
FIG. 1 is a block diagram of a monitoring system which embodies the present invention.

FIG. 1 is a diagrammatic view of a surveillance or monitoring system 10 which embodies the present invention which is used monitor activity in a selected region or area. The monitoring system 10 also includes a camera unit 12, a computer workstation 13, which are operatively coupled by a network shown schematically at 14. The network 14 may be a local area network, the Internet, some other type of network, a modem link or a combination of these technologies. The computer workstation 13 may be a personal computer including a processor 17, a keyboard 18, a mouse 19 and a display unit 21.

The camera unit 12 includes video camera 23. Video camera 23 in the disclosed embodiment is a known monochrome camera that outputs gray-scale images. However, the present invention may be utilized with a color video camera or some other type of two-dimensional image detector, such as an infrared detector. Video camera 23 includes detector 24. Detector 24 may be a charge coupled device (CCD) or a CMOS image detector as known in the art. Video camera 23 not-illustrated includes optics of a known type, which focuses an image on detector 24.

Camera unit 12 further includes an image processing section 27. The image processing section 27 includes a video interface circuit 28 to receive the output of image detector 24. A network interface 29 facilitates communication across network 14. Image processing section 27 could also include a modem in addition to or in place of network interface 29. This would enable communications via a telephone line. Image processing section 27 further includes a processor 33. Processor 33 preferably consists of a digital signal processor and its corresponding volatile memory. Image processing section 27 includes a non-volatile memory such as hard disk drive 34 illustrated in FIG. 1. Hard disk drive 34 could optionally be replaced or supplemented by another suitable type of non-volatile memory such as FLASH memory, EPROM memory or DRAM memory with battery backup.

Monitoring system 10 further includes RF detector 35. RF detector 35 is coupled to image processing section 27. An antenna on RF detector 35 (not shown) preferably provides coverage to the same area as the field of view of camera 12. The nature and use of RF detector 35 is explained below. FIG. 1 illustrates a single RF detector 35 located near camera 12. This is not necessary. One or more RF detectors 35 may be disposed at locations within the controlled space. In this case each such RF detector 35 must include a communications link back to image processing section 27 or computer workstation 13 for coordination of data.

In the preferred embodiment, image processing section 27 is co-located in the same physical housing as camera 23. Thus camera unit 12 is a stand alone device which may be directly coupled to network 14. However, it will be recognized by those skilled in the art that image processing section 27 could alternatively be implemented within computer workstation 13 and physically separate from camera 23. In this alternative, computer workstation 13 preferably includes a plug-in video capture card serving a video interface and a plug-in network interface card for communication via network 14. Though the embodiment disclosed includes a single camera 23, it is possible to provide plural cameras with a single image processing section.

The basic system performs three data processing steps for every image of a video sequence to recognize events. The three steps are detecting objects, tracking objects and analyzing the motion graph. These steps will be described in conjunction with FIGS. 2A to 2H and FIG. 3.

Once objects are detected in a video image, the next step is to track each object through the video sequence. This task is done by linking objects in the previous frame to their corresponding objects in the current frame. Correspondence is established by matching objects with their nearest neighbors. The path of links which follows a given object through successive frames is called an object's track. The objects and their tracks create a directed graph which represents the history of the motion of the objects in a video sequence. This directed graph is called a motion graph. The goal of this step is to create a motion graph for use by the next step in event recognition.

Finally, to recognize events, the system analyzes the motion graph. The preferred embodiment of the system recognizes the following vocabulary of events: ENTER, EXIT, REST, MOVE, DEPOSIT, REMOVE, LIGHTS-ON and LIGHTS-OUT. These events are examples of the most common in an office environment where the main interaction is between people and smaller stationary objects. Other examples would be applicable to monitoring outdoors, such as a parking lot.

Figure 3:
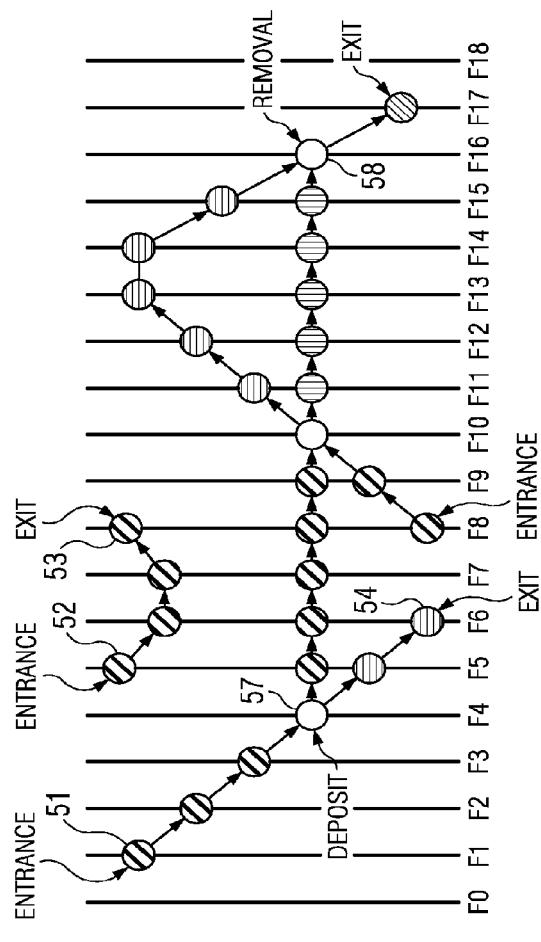
FIG. 3 is a motion analysis diagram indicating how the motion of objects in a video image is analyzed by the system of FIG. 1 (prior art)

The image processing section 27 analyzes the motion graph by tracking movement or non-movement of each identified change region through a succession of the frames or images from the video camera. For purposes of facilitating an understanding of the present invention, one known motion analysis technique will be briefly summarized with reference to FIG. 3. Although it will be recognized that motion analysis in the video images is carried out in two dimensions, for purposes of convenience the diagram of FIG. 3 shows just one dimension.

The initial processing of video images by image processing section 27 in the preferred embodiment will now be described with reference to FIGS. 2A to 2H and FIG. 3. More specifically, FIG. 2A is a diagrammatic view of a video image produced by the video camera 12 when it is directed toward an area which, in this example, has arbitrarily been selected to be the corner of a room. The video image of FIG. 2A is saved as a reference image. FIG. 2B is a similar video image that was obtained from the camera 12 at a later point in time, after an object 41 has been introduced into the monitored area. In this case, the object 41 is a person, who has walked into the corner of the room and thus into the field of view of the video camera 12. The video camera 12 is stationary, and thus the single difference between the images of FIGS. 2A and 2B is the presence of the person 41 in FIG. 2B. The presence and movement of the person 41 is detected in the following manner.

First, the gray-scale image of FIG. 2B is subtracted from the gray-scale image of FIG. 2A, on a pixel-by-pixel basis. The absolute value of the difference for each pixel is then determined and the result is the gray-scale difference image of FIG. 2C. Then, the difference image of FIG. 2C is sub-sampled in order to reduce the number of pixels, for example to a 128 by 128 or 256 by 256 pixel image. The resulting low-resolution image is shown in FIG. 2D. It will be recognized that it is alternatively possible to sub-sample each of the images of FIGS. 2A and 2B before determining the difference and absolute value for each pixel, which reduces the number of pixels that need to be processed, and therefore reduces the amount of time needed to obtain the image of FIG. 2D.

The low-resolution difference image of FIG. 2D is then thresholded. In other words, the gray-scale value for each pixel in the image of FIG. 2D is compared to a predetermined threshold, and the pixel is then set to be either on or off (black or white), depending on whether the value is above or below the threshold. The resulting threshold image is shown in FIG. 2E. Each pixel in the threshold image of FIG. 2E can be represented by a binary "1" or a binary "0", depending on whether the pixel is considered to be on or off.

Morphological processing is then carried out on each pixel of the threshold image of FIG. 2E, by first performing a dilate operation and then performing an erode operation. More specifically, each pixel is processed by viewing it as the center pixel in a three-by-three matrix of pixels. During the dilate operation for each pixel in the threshold image of FIG. 2E, if any one of the eight neighboring pixels in that image is a logic "1", the pixel of interest is set to a logic "1". The resulting dilate image is shown in FIG. 2F. During the subsequent erode operation for each pixel in the dilate image of FIG. 2F, if any one of the eight neighboring pixels in that image is a logic "0", then the pixel of interest is set to a logic "0". The result is the erode image of FIG. 2G.

The erode image of FIG. 2G is then analyzed to identify each region of contiguous logic "1" pixels. Each such region of contiguous logic "1" pixels represents a change region, corresponding to an object which has been introduced into the image of FIG. 2B and which was not present in the image of FIG. 2A, such as the person 41. This analysis can be carried out using known techniques, such as run-length encoding followed by connected-component analysis.

With respect to each detected change region, the image processing section 27 determines a bounding box for the change region. An example of a bounding box is shown at 43 in FIG. 2H. It will be noted that the bounding box 43 is a rectangular box, just large enough to contain the entire change region. That is, no pixel of the change region lies outside the box, but every side of the box touches at least one pixel of the change region.

The above-described image processing is carried out for each image in a succession of images provided by the video camera 12. That is, each of these successive images is processed with respect to the reference image of FIG. 2A, in the same manner that was described above for the image of FIG. 2B.

Image processing section 27 then carries out motion analysis, by tracking movement or non-movement of each identified change region through a succession of the frames or images from the video camera. For purposes of facilitating an understanding of the present invention, one known motion analysis technique will be briefly summarized with reference to FIG. 3. Although it will be recognized that motion analysis in the video images is carried out in two dimensions, for purposes of convenience the diagram of FIG. 3 shows just one dimension.

In FIG. 3, the nineteen vertical lines F0 through F18 each represent a respective frame or image in a series of successive images from the video camera 12. In FIG. 3, the horizontal dimension represents time and the vertical dimension represents one dimension of movement of an object within a two-dimensional image. When an object which was not previously present first appears, for example at 51 or 52, it is identified as an ENTER event. When an object which was previously present is found to no longer be present, for example at 53 or 54, it is designated an EXIT event. If an existing object splits into two objects, one of which is moving and the other of which is stationary, for example as at 57, it is designated a DEPOSIT event. This would occur, for example, when a person who is carrying a briefcase sets it down on a table and then walks away.

If a moving object merges with a stationary object and then continues to move while the stationary object disappears, as at 58, it is designated a REMOVE event. This would correspond to a situation where a person walks to a notebook resting on a table, picks up the notebook and walks away. Three other types of events, which are not specifically illustrated in FIG. 3, are a REST event, a MOVE event and a LIGHTSOUT event. A REST event occurs when a moving object comes to a stop but continues to be present without moving. A practical example is a situation where the objects being monitored are vehicles in a parking lot, a car pulls into a parking space and thereafter remains stationary. A MOVE event occurs when a detected object which has been stationary begins moving again, for example when a car that has been parked begins moving. A LIGHTSOUT event occurs when the entire detected image suddenly changes, for example when the lights in a monitored room are turned out and the room becomes dark. A LIGHTSOUT event can be detected without all of the image processing described above in association with FIGS. 2 and 3.

In the present invention the surveillance system can be programmed to detect complex events as taught in U.S. Pat. No. 6,628,835, entitled METHOD AND SYSTEM FOR DEFINING AND RECOGNIZING COMPLEX EVENTS IN A VIDEO SEQUENCE. For example, the event THEFT includes a REMOVE event followed by an EXIT event. The EXIT event provides context for the REMOVE event that enables the system to filter out uninteresting cases in which the person does not leave the area with the object they picked up. This application describes the invention of such a complex event detection system. A complex event is structured, in that it is made up of one or more sub-events. The sub-events of a complex event may be simple events, or they may be complex, enabling the definition of event hierarchies. Event may refer to either a simple or a complex event. In our theft example above, REMOVE and EXIT are simple events, and THEFT is a complex event. A user may also define a further event, for example CRIME-SPREE, which may have one or more complex THEFT events as sub-events.

It is optionally possible to also carry out an identification analysis, in an attempt to identify a detected object. For example, with a small amount of knowledge about the topography of the monitored area, image processing section 27 can use the position in the image of the midpoint of the lower side of the object's bounding box in order to identify how far the object is from the camera. Then, knowing how tall a person that far from the camera would be, image processing section 27 can evaluate the vertical height of the bounding box in the image, in order to determine whether the object generating the change region is tall enough to be a person. If the object is sufficiently tall to be a person, it can be assumed that it is a person.

Alternatively, image processing section 27 could map the endpoints of the lower side of a bounding box 43 to a map of the controlled space. Given the scale of the map, image processing section 27 could determine the distance between these two points on the map, which would also be the distance between them in the image and would thus be the length of the lower side of bounding box 43 in the image. Image processing section 27 could then determine the height of bounding box 43 in the image and evaluate whether the object in question is tall enough to be a person. Again, if the object is sufficiently tall to be a person, image processing section 27 assumes that it is a person.

If the object is not sufficiently tall to be a person, then image processing section 27 can carry out an object analysis procedure, by analyzing the image of the object in an attempt to classify it as one of several common objects, such as a briefcase, a notebook, a box, or a computer monitor. If the object is not specifically identified through this approach, then it is ultimately identified as an "unknown" object.

The result of this event detection is a time ordered list of events. Table 1 show an example of such a list.

TABLE 1

| Time | Event | Object | Location |
|------|-------|--------|----------|
| 15:34 | enter | per3 | 15.4:7.8 |
| 15:38 | enter | per4 | 15.4:7.8 |
| 15:41 | exit | per4 | 15.4:18.3 |
| 15:42 | rest | per3 | 13.8:10.2 |
| 15:48 | move | per3 | 13.8:10.2 |

In this example an object per3 identified as a person enters at time 15:34, comes to rest at 15:41 and begins to move again at 1548. An object per4 identified as a person enters at time 15:38 and exits at time 15:42. The location can be identified by coordinates in the view of camera 12 or in map coordinates determined according to the teaching of U.S. Pat. No. 6,816,184, entitled METHOD AND APPARATUS FOR MAPPING A LOCATION FROM A VIDEO IMAGE TO A MAP. Because each initial appearance of a movable object causes an ENTER event, such a list tracks all identified objects.

Not shown in Table 1, system 10 may save data indicating the path of motion of each identified object through the controlled space. Such a path is described in U.S. Pat. No. 7,023,469, entitled AUTOMATIVE VIDEO MONITORING SYSTEM WHICH SELECTIVE SAVES INFORMATION. This path may be stored as a series of coordinates in the view of camera 12 or in map coordinates.

Also not shown in Table 1, system 10 may include pan-tilt-zoom (PTZ) controls over camera 12. Thus the view of camera 12 is not fixed but is dependent upon the current PTZ state. Such PTZ cameras are often used for security in outdoor environments, such as parking lots. In this case each entry in the event list would further include the current PTZ state of the camera. Image processing section 27 is preferably programmed to be able to convert screen coordinates and the current PTZ state to map coordinates. This conversion will permit mapping of an RF source detected by RF detector 35 to an identified object.

Most systems including PTZ cameras employ a pre-programmed PTZ pattern for each such camera unless manually controlled. It is possible to program system 10 through computer workstation 13 to track identified objects as they pass through the controller space. The PTZ controller can track a single identified object or track one of a set of objects identified by a correlated RF emission as described below.

Figure 4:
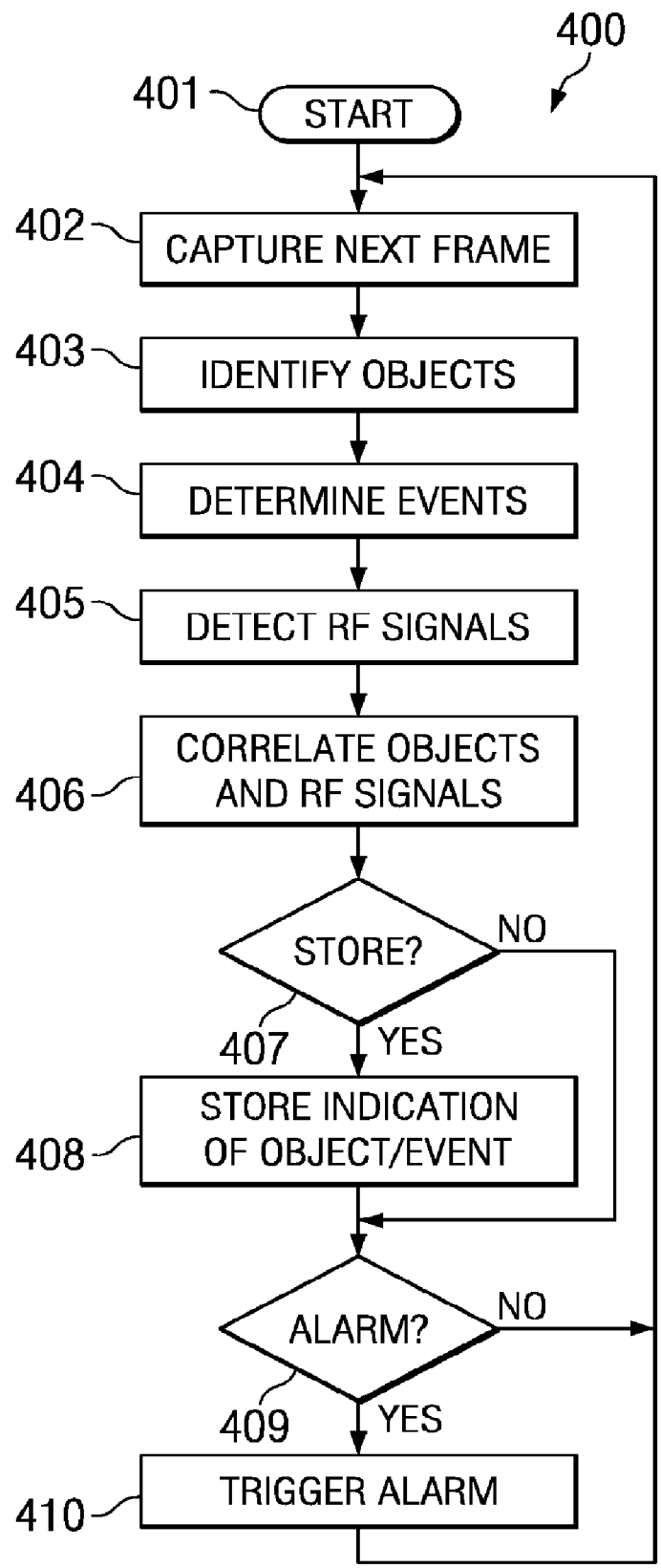
FIG. 4 is a flow chart of the operation of a video surveillance system according to this invention.

FIG. 4 illustrates a flow chart of process 400 including an example of data processing according to this invention. Process 400 begins at start block 401. Block 402 captures the next frame from video camera 12. Block 403 identifies moving objects in the image. This process preferably occurs as described above in conjunction with FIGS. 2A to 2H. The result is a set of objects in the current image.

Block 404 determines events related to the detected objects. This process preferably occurs as described above in conjunction with FIG. 3. The result is a list of events corresponding to each detected object.

Block 405 detects radio frequency (RF) signals from objects in the view of video camera 12. The preferred embodiment assumes that in the future many people will be carrying voice over Internet protocol (VOIP) enabled WIFI portable telephones. These phones typically operate in a promiscuous mode in which they beacon in an attempt to connect to access points. RF detector 30 detects these signals. These signals generally include a MAC address which uniquely identifies the WIFI device. RF detector 30 preferably provides some measure of RF signal strength and perhaps directionality.

Block 406 correlates detected moving objects in the series of images with the detected RF signals. This process preferably uses a location estimate for each detected moving object determined in the manner described above and in U.S. Pat. No. 6,816,184, entitled METHOD AND APPARATUS FOR MAPPING A LOCATION FROM A VIDEO IMAGE TO A MAP. The signal strength measure and optional directionality information permits correlation of a particular detected moving object and a corresponding RF signal. This correlation could be that no RF source corresponds to the detected moving object. This would occur if a person not carrying an RF emitting device comes into the controlled space.

The following are examples of methods for mapping an object in the video view with an RF signal source. A RF signal strength increasing in time would be mapped to an object with a minimal bounding box 43 increasing in time. An RF signal strength decreasing in time would be mapped to an object with a minimal bounding box 43 decreasing in time. An ENTER event would correlate the moving object triggering the event with a newly detected RF signal. If RF detector 35 has a directional antenna, the direction of the RF signal location can be mapped to the location of the video object. In some instances a particular operation of a device triggers a particular RF signal. As an example, a person putting a wireless phone to his ear to make or answer a call is time correlated with a change in the RF signal. Thus recognition of a gesture in the video image consistent with an RF signal change allows correlation of the RF signal source and the video object. In the case of plural RF signal detectors 35, image processing section 27 must be calibrated to the locations and fields of reception of these detectors. Other possible means for this correlation include matching the RF emission with an object having a corresponding history. Such history may be a commonly used path through the controlled space, the typical velocity of the identified object and stride length. These additional factors may permit accurate tracking of a person through a crowd where the person is temporarily occluded by others in the crowd. These additional factors may also contribute to determination of the best view to save.

Correlation of identified moving object and RF sources preferably includes storing a list of objects and their corresponding RF source. This may include adding an RF source identifier to each event in the event list of Table 1. Table 2 shows this annotated event list.

TABLE 2

| Time | Event | Object | RF Source | Location |
|------|-------|--------|-----------|----------|
| 15:34 | enter | per3 | — | 15.4:7.8 |
| 15:38 | enter | per4 | Dorthy | 15.4:7.8 |

TABLE 2-continued

| Time | Event | Object | RF Source | Location |
|------|-------|--------|-----------|----------|
| 15:41 | exit | per4 | Dorthy | 15.4:18.3 |
| 15:42 | rest | per3 | — | 13.8:10.2 |
| 15:48 | move | per3 | — | 13.8:10.2 |

In Table 2 object per3 does not correlate with any RF source. Object per4 correlates with a particular RF source of a known person Dorthy. Thus the RF source identification is the name of the person using that RF source. Note that it is possible that an RF source is detected with corresponding identification information (such as a MAC address for WIFI signals) that in not tied to a known person in a database. This invention preferably includes a manner to identify these cases, such as with an arbitrarily assigned RF emission name. Each event in this event list preferably also includes a first pointer (not shown) to a location where the object path is stored and a second pointer (not shown) to a location where the best image is stored.

Test block 407 determines if predetermined criteria for storing data is satisfied. The various options will be further discussed below. In general the criteria could be a combination of an event which may be a complex event, a particular object or type of object and a location within the controlled space viewed by video camera 12. One example is attempting to recognize a face in the viewed space and saving the face object when it is largest. This is taught in U.S. Pat. No. 7,023,469, entitled AUTOMATIC VIDEO MONITORING SYSTEM WHICH SELECTIVELY SAVES INFORMATION. If any store criteria is satisfied (Yes at test block 407), then data is saved in block 408. In the embodiment illustrated in FIG. 1, this data identified by the store criteria would be saved into non-volatile memory such as a hard disk drive 34 included in image processing section 27 or a similar hard disk drive in computer workstation 13. This data preferably includes identification of the object, the triggering events and a time stamp. Depending on the particular case, an image or a portion of an image may also be saved. This image data could be the bounding box 43 of the corresponding detected object. In accordance with the teaching of U.S. Pat. No. 7,023,469, entitled AUTOMATIC VIDEO MONITORING SYSTEM WHICH SELECTIVELY SAVES INFORMATION, image processing section 27 may compare the object bounding box 43 with the bounding box in the prior image and temporarily store the largest bounding box 43. The image saved could be this largest temporarily saved bouncing box 43. After this store operation, flow proceeds to test block 409. If no store criteria is satisfied (No at test block 407), the flow proceeds to test block 409.

Test block 409 determines if a predetermined criteria for signaling an alarm. The criteria for signaling an alarm is of the same kind as the criteria for storing data. Signaling an alarm is preferably triggered by a combination of event, object and location. For example, one criteria could be detection of a person not correlated with an RF source indicating he is an employee at REST near a controlled door. In this example, the presence of a person identified as an employee would not trigger an alarm even if at REST near the door. If any criteria for trigging an alarm is satisfied (Yes at text block 409), then an alarm is triggered in block 410. This alarm could take many forms. If there is a monitoring room for plural security cameras such as video camera 12, this alarm could be an audible or visible alarm within the monitoring room. The alarm could also be a telephone call or a text message to a portable telephone or an email to a remote location, which may be a mobile receiver. After this alarm operation, flow proceeds to block 402 for the next frame. If no alarm criteria is satisfied (No at test block 409), the flow proceeds to block 402 for the next frame.

The RF detection is not limited to WIFI devices. Other technologies known in the art are also applicable. One of these technologies is Bluetooth. Bluetooth is a short range radio frequency communications protocol typically used between computers and computer peripherals. Like WIFI, Bluetooth involves an active radio frequency transmitter on the portable unit. RF detector 35 is optionally responsive to Bluetooth signals.

Active RF sources of this type typically produce different RF signals depending upon whether they are actively communicating or are in an unconnected mode. Even in a unconnected mode such devices typically produce some RF emissions. For example, a typically wireless telephone produces a beacon signal to alert the fixed wireless infrastructure of its presence. The inventors believe that a handheld device used by a person on foot will typically generate at least two or three such beacon signals while traversing the controlled space. These signals will be sufficient to permit detection of the RF emission while the person is identified by image processing section 27.

It is also known in the art to attach passive radio frequency identification (RFID) tags to movable objects. To use RFID technology, RF detector 35 periodically transmits an interrogation signal. This interrogation signal triggers a response in the RFID tags. This response includes at least identification of the specific RFID tag. This could be used by requiring all authorized persons, such as employees of a business, to carry individualized RFID tags. Any person recognized as a moving object in the video that does not correspond to an RFID tag is then unauthorized.

Figure 5:
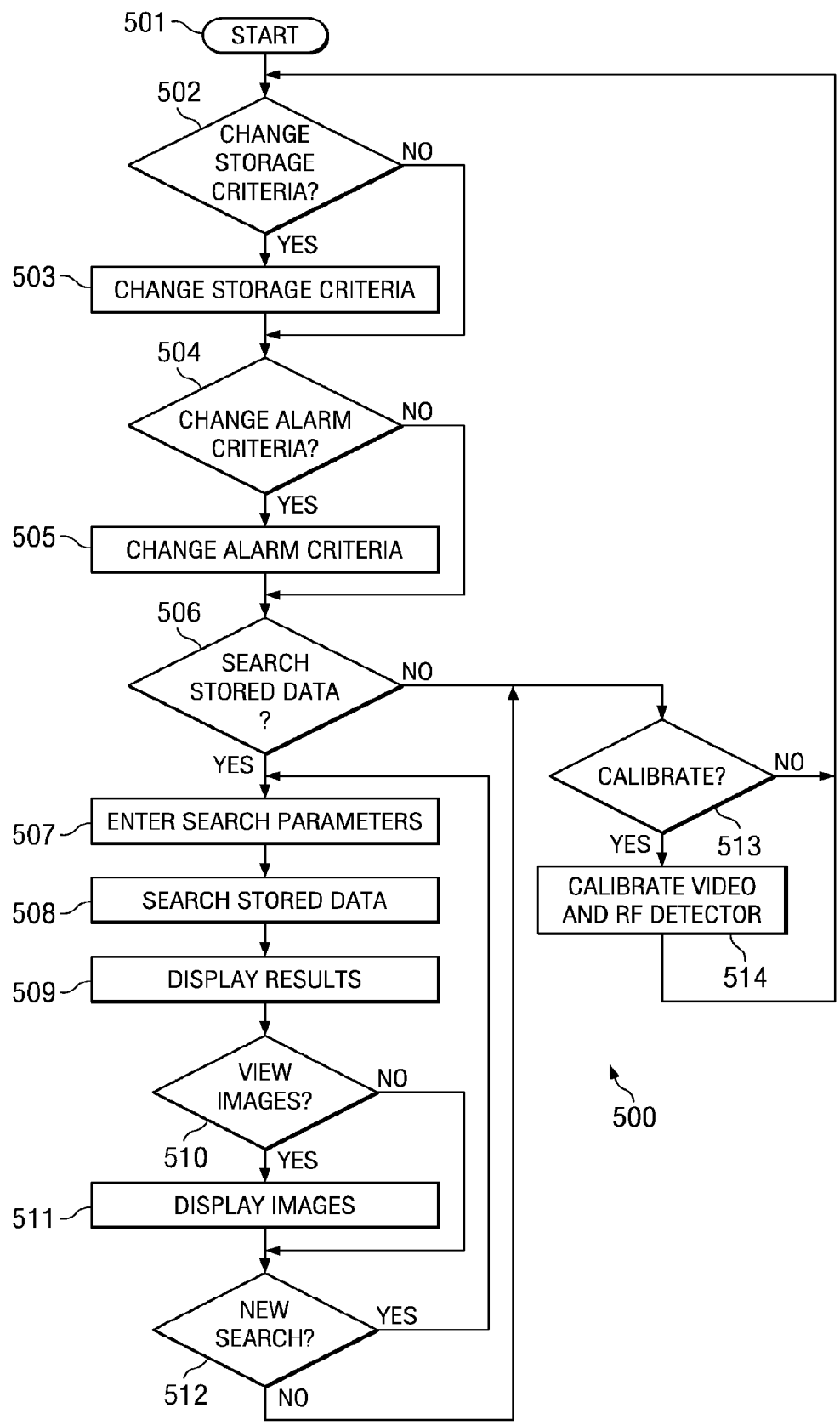
FIG. 5 is a flow chart of further operation of a video surveillance system according to this invention.

FIG. 5 illustrates a flow chart of process 500 illustrating an example of using system 10 in surveillance. Process 500 preferably operates as a user-interactive program running on computer workstation 13. Process 500 begins with start block 501. Test block 502 determines if the user desires to change the storage criteria. If the user desires to change the storage criteria (Yes at test block 502), then process 500 enables entry of this changed search criteria at block 503. As described above, this storage criteria is a set of corresponding events, detected moving objects and other factors which trigger storage of images and corresponding data. A change in search criteria may include specification of a new search criteria, deletion of a prior search criteria or editing to change a prior search criteria. Such change in search criteria could correspond to change in status of the protected space. An example is changing the employees who do not trigger storage to a subset of employees during a mass vacation. Thus a previously authorized person may no longer be authorized during the time of the changed status. Following entry of changed storage criteria, this new storage criteria is searched during test block 407 to make a storage decision for current data.

Test block 504 follows a negative decision in test block 502 or changing the search criteria in block 503. Test block 504 determines if the user desires to change the alarm criteria. If the user desires to enter change the alarm criteria (Yes at test block 504), then process 500 enables entry of this changed alarm criteria at block 505. Following entry of changed alarm criteria, this new alarm criteria is searched during test block 409 to make an alarm decision for current data. This process preferably occurs in a manner similar to changing the search criteria described above.

Test block 506 follows a negative decision in test block 504 or changing the alarm criteria in block 505. Test block 506 determines if the user desires to search stored data. If the user desires to search stored data (Yes at test block 506), then process 500 enables entry of search parameters at block 507. These search criteria include one or more of the object, events, type of RF emission detected or other information used in test block 407 to determine if data is to be stored. For example, the search may be for all persons or a particular set of persons who were within a predefined area within a prescribed time period.

Block 508 searches all stored data to find such data meeting the search parameters. In this regard, block 408 stores such data in a manner permitting later search and identification in block 508. Note that data must have been stored by block 408 to be available for search in block 508. Block 509 displays information relating to the stored data. This could take place via a list such as shown in Table 2 displayed on display unit 21 of computer workstation 13. Such a list would include the parameters that triggered the storage, such as time, event, identity of the object, etc. Such a list should also indicate whether an image was also stored. In the preferred embodiment such lists are stored in a fashion permitting selection by search parameters such as time, event, identity of object, locations within the object path and the like. Thus a user could obtain a list of all persons within a particular set of persons who loitered at a particular location within a limited time period. This list could include a display of a thumbnail of any stored image corresponding to the object.

Test block 510 determines if the user desires to view any stored image corresponding to the search results. As noted above, the storage criteria of text block 407 may cause storage of image data from camera 23. If the user desires to view this stored image (Yes in test block 510), then block 511 displays the stored image. In the preferred embodiment the viewing takes place via display unit 21 of computer workstation 13. These stored images may be of two types. The first type is an overlay of the object path through the field of view of the camera. The second type is a image of the object saved by image processing section 27.

Test block 512 determines if the user desires a new search. If the user desires a new search (Yes at test block 512), then process 500 returns to block 507 for entry of search parameters.

If the user does not desire a new search (No at text block 512) or the user does not want to search stored data (No at test block 506), then test block 513 determines if the user wants to calibrate the system. If the user wants to calibrate the system (Yes at test block 513), then block It is desirable to include a manual or automatic process to permit system 10 to calibrate the correlation between a detected video object and an RF signal. This process preferably includes introducing an easily identifiable object having a predetermined RF signal. This could take the form of a single person entering the controlled space with a known RF signal source. This person would walk around various locations within the controlled space enabling system 10 to confirm parameters for correlating a video object and an RF signal source. Clearing the controlled space of all other moving objects means that the sole identified object corresponds to the RF signal source. If clearing the controlled space of all other movable objects is not feasible, then the calibration person could hold in the view of camera 12 an easily identifiable visual object. This could be a distinctive visual marker carried by the person. The identified object including the visual marker corresponds to the RF signal source. Alternatively, the user could place one or more RF signal sources at known locations for calibration. In another alternative, a user could manually input data indicating with which video object corresponds to the RF signal source.

Following calibration or if the user does not desire to calibrate the system (No at text block 513), process 500 loops back to test block 502.

This example system 10 includes a camera 12 with data processing capacity to correlate the detected moving objects and the RF signal sources. Those skilled in the art would realize that this invention could be practiced with a camera that merely captures and digitizes images which are transmitted to a central server for analysis. Computer workstation 13 preferably also receives signals from RF detector 35 via some communications link. For enhanced security, these transmissions should be encrypted.

What is claimed is:

1. A method of monitoring an area, comprising the steps of:
periodically detecting an image of the area;
identifying and tracking a moving object in a succession of the detected images;
forming a bounding box for each identified object in each image just large enough to include the identified object;
detecting radio frequency emissions from objects within the area including detection of corresponding radio frequency emission strength; and
correlating an identified moving object in the images with a detected radio frequency emission including correlating an identified moving object having a corresponding bounding box growing larger with time with a detected radio frequency emission strength growing larger with time.

2. A method of monitoring an area, comprising the steps of:
periodically detecting an image of the area;
identifying and tracking a moving object in a succession of the detected images;
detecting an event in the tracking of a moving object;
detecting radio frequency emissions from objects within the area;
correlating an identified moving object in the images with a detected radio frequency emission;
storing data in non-volatile memory upon detection of a predetermined combination of an event in the tracking of a moving object and no correlation to any detected radio frequency emission.

3. The method of claim 2, further comprising:
storing image data of a corresponding moving object in non-volatile memory data corresponding to said data stored upon detection of the predetermined combination of an event in the tracking of a moving object and no correlation to any detected radio frequency emission.

4. The method of claim 2, further comprising:
triggering an alarm upon said detection of a predetermined combination of an event in the tracking of a moving object and no correlation to any detected radio frequency emission.

5. A method of monitoring an area, comprising the steps of:
periodically detecting an image of the area;
identifying and tracking a moving object in a succession of the detected images;
forming a bounding box for each identified object in each image just large enough to include the identified object;
detecting radio frequency emissions from objects within the area including detection of corresponding radio frequency emission strength;
correlating an identified moving object with a detected radio frequency emission including correlating an identified moving object having a corresponding bounding box growing smaller with time with a detected radio frequency emission strength growing smaller with time.

6. A method of monitoring an area, comprising the steps of:
periodically detecting an image of the area;
identifying and tracking a moving object in a succession of the detected images;
detecting radio frequency emissions from objects within the area including detecting a RF emission with a directionality encompassing a sub-area less than all of the area; and
correlating an identified moving object in the images with a detected radio frequency emission including correlating an identified moving object in the images within said sub-area with said detected radio frequency emission.

7. A method of monitoring an area, comprising the steps of:
periodically detecting an image of the area including controlling pan, tilt and zoom of a camera; and
identifying and tracking a moving object in a succession of the detected images;
detecting radio frequency emissions from objects within the area;
correlating an identified moving object in the images with a detected radio frequency emission; and
said step of tracking the moving object includes detecting the moving object in screen coordinates within a frame of the image of the camera and converting a track of the moving object into map coordinates dependent upon a pan, tilt and zoom state of the camera.

* * * * *